US005587767A

United States Patent [19]

Islam et al.

[11] Patent Number: 5,587,767

[45] Date of Patent: Dec. 24, 1996

[54] DIGITAL FILM HEAT PROCESSOR AND METHOD OF DEVELOPING DIGITAL FILM

[75] Inventors: Abu S. Islam, Mt. Vernon; Robert J. Kleckner, Yorktown Hgts.; Leo Chin, Bronx, all of N.Y.; Hardy Sonnenberg, Puslinch, Canada; Anthony A. Klein, Swampscott, Mass.

[73] Assignee: Xerox Corporation, Stamford, Conn.

[21] Appl. No.: 434,960

[22] Filed: May 4, 1995

[51] Int. Cl.[6] ............................ G03B 27/32; G03D 13/00

[52] U.S. Cl. ............................................ 355/27; 396/575

[58] Field of Search ................................ 355/27, 28, 72, 355/77; 354/298, 299, 331

[56] References Cited

U.S. PATENT DOCUMENTS 3,765,759 10/1973 Yamada .................................... 355/45
4,181,420 1/1980 Blume et al. ........................... 354/299
4,977,422 12/1980 Vaughan, IV ........................... 354/317

*Primary Examiner*—Arthur T. Grimley
*Assistant Examiner*—Herbert V. Kerner
*Attorney, Agent, or Firm*—Oliff & Berridge

[57] ABSTRACT

An apparatus and method of developing a heat developing film includes a film support surface for supporting a film and heaters for developing the film supported on the film support surface. The film support surface may either be stationary or form part of a film transport. The film transport may either be a continuous film transport or a reciprocating film transport. The continuous film transport may be inclined or include an input pinch roller. In addition, the heaters may either be stationary, reciprocatable, or pivotable. The heaters are radiant heaters which may include a profiled heater output to control distortion of the film. The apparatus may be provided as a stand-alone unit or may be coupled, either externally to or within, a film exposure device.

21 Claims, 2 Drawing Sheets

DIGITAL FILM HEAT PROCESSOR AND METHOD OF DEVELOPING DIGITAL FILM

BACKGROUND

1. Field of the Invention

The present invention relates to a method and apparatus for developing digital film, and specifically, to a method and apparatus for developing film by applying heat to the film.

2. Description of Related Art

In conventional digital film processing apparatuses, the film is first made sensitive to light by electrostatically charging the film. A latent image is then formed on the film by exposing the film to light from a modulated laser or similar device. The exposed film is developed by applying heat to the film.

In a first conventional film processing apparatus, a heated metal plate is provided for heating the film. The film is manually applied directly to the surface of the heated plate. The operator then manually counts a period of time, after which the film is removed from the surface of the plate. Since this arrangement requires extensive manual activity, productivity is low and film developing costs are high.

In a second conventional film processing apparatus, heating is accomplished by providing at least one heated roller between input and exit pinch rollers. The pinch rollers serve to feed the film past the heated roller while maintaining tension on the film to assure good contact with the heated roller. The film is heated by conduction through contact with the heated roller.

However, with the second arrangement, several problems arise. First, the leading and trailing edges of the film may be incompletely or poorly developed. This occurs because the leading and trailing edges are not under tension when they pass over the heated roller. As a result, sufficient contact between these edges of the film and the heated roller is not achieved.

In addition, the side edges of the film may also be poorly or incompletely developed. This is because the ends of the heated roller, which are mechanically coupled to other portions of the processing apparatus (e.g. the bearings, frame, etc.), act as heat sinks. Consequently, the temperature at the ends of the heated roller may be insufficient to properly develop the latent image at the side edges of the film. While the heated roller may be lengthened in order to provide a more uniform temperature distribution along that portion of the heated roller in contact with the film, this has the undesirable consequences of increasing both manufacturing costs and the size of the footprint of the film processing apparatus.

Moreover, during the film heating process, emulsion of the film softens and must be cooled prior to being mechanically contacted. Unless an external cooling device is provided for cooling the film prior to contact with the exit pinch rollers, the exit pinch rollers must be positioned sufficiently far down stream of the heated roller in order to permit the film to be cooled by natural convection. As a consequence, film is wasted on the leading and trailing edges.

Further, heat-developing film generally includes a polyester base which may permanently deform when heated under tension. In addition, if the film is not sufficiently cooled prior to entering the exit roller nip, further cooling occurring while the film is constrained in the nip can lead to the formation of ripples or other undesirable deformations of the film.

For the foregoing reasons, there exists a need for a film processor which can develop heat-developing film with high productivity and at lower cost. There also exists a need for a film processor which can develop the film without leading, trailing, or side edge deletion. In addition, there exists a need for a film processor that can develop heat-developing film while maintaining dimensional stability of the film.

SUMMARY OF THE INVENTION

The present invention is directed to a film processor that satisfies these needs. A film processor having features of the present invention includes a film support surface for supporting a film and a heating device for developing the film without contacting the film. With the above arrangement, dimensional stability of the film is ensured, consistency in developing the entire latent image is obtained, and high productivity and lower cost in developing the film is realized.

In accordance with another embodiment of the invention, the film support surface forms part of a continuous film transport. With this arrangement, even higher productivity in developing the film can be achieved.

In accordance with additional embodiments of the invention, the continuous film transport can be inclined or provided with an input pinch roller. With these embodiments, reduction in the footprint of the film processor can be achieved.

In accordance with a still further embodiment of the invention, the film support surface forms part of a reciprocating film transport. With this arrangement, reductions in the footprint of the film processor is attained.

In accordance with yet another embodiment of the invention, the heating device is reciprocatable and is provided with a reciprocating film transport. With this arrangement, the footprint of the film processor is minimized.

In accordance with a still further embodiment, the heating device is sized to develop the entire surface of the film simultaneously. With this arrangement, productivity is increased and lower operating temperatures are realized.

In accordance with another embodiment of the invention, the heating means comprises a radiant heating device. With this arrangement, a desired heater output profile can be easily and efficiently attained.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Preferred embodiments of the invention are described hereafter, with reference to the drawings.

Figure 1:
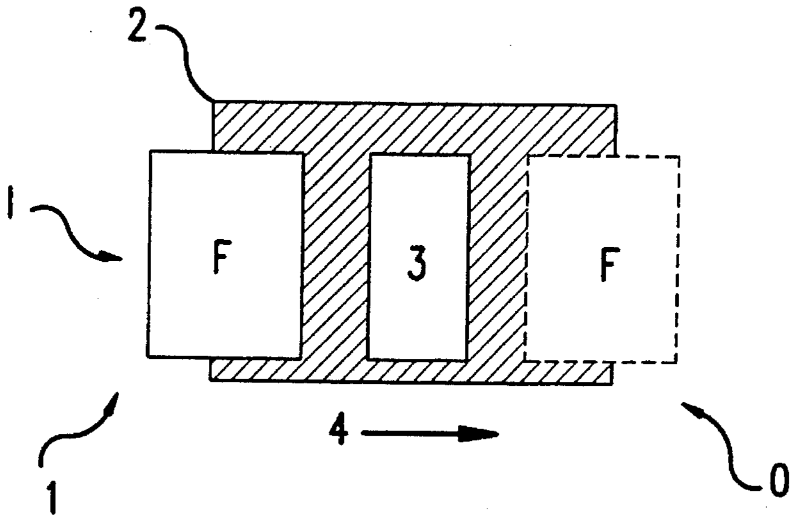
FIG. 1 is a schematic view of a film heat processor according to a first embodiment of the invention.

FIG. 1 is a schematic view of film heat processor according to a first embodiment of the invention.

The film heat processor 1 includes a continuous transport 2, such as an endless belt conveyor, for receiving a heat-developing film F at input I. The film F may either be manually loaded onto the continuous transport 2 or directly supplied thereto from a well known film exposure device, such as an imagesetter. The film may be, by way of example, a migration imaging film that can be developed using radiant energy.

The continuous transport 2 conveys the film in the direction shown by arrow 4 past heaters 3 for developing. Since the heaters 3 are provided on opposite sides of the film F, only one heater is visible in the FIG. 1. The heaters 3 are configured so as to have an output that will minimize or eliminate thermal distortion of the film. Specifically, the heaters 3 are arranged to have a lower heat output at the ends of the heaters 3 (measured along a film conveying direction), and a higher heat output at a central portion thereof. With this arrangement, thermal distortion during the initial heating and cooling stages of the film at the heater input and output ends, respectively, is minimized. In addition, the heater output is profiled so that the film temperature is spatially constant along a direction perpendicular to the direction of movement of the film F.

The desired heater output can be achieved in a number of ways by one familiar with the conventional art. Specific examples of heating arrangements for achieving the desired results are discussed next.

While heaters 3 each may comprise a plurality of convection "ovens" serially arranged and maintained at different temperatures, a preferred arrangement for heaters 3 instead includes the use of radiant heaters. Radiant heaters provide a more compact, less costly, and simpler arrangement for producing a desired heater output profile. Filters may be provided, where appropriate, to permit the radiant heater to be used with films sensative to different light wavelengths. With radiant heaters, the material of the endless belt of the continuous transport 2 should be selected to have a low specific heat and good transparency so as to neither absorb nor impede the radiant energy. One such material may include Teflon coated fiberglass.

Specific radiant heaters may include, for example, etched foil heaters or fixed output heaters. With the etched foil heaters, the desired heat output profile may be obtained by changing the density of the serpentine pattern of the heating circuits of the heater. Specifically, an increase in density in a particular region of the heater will result in a corresponding increases in heat output for that region. Although more cumbersome, fixed output radiant heaters can be used wherein heater panels of different output are arranged to achieve the desired effect. Thermal distortion of the film may also be controlled by controlling the relative movement between the film and the heaters.

Further, while plural heaters 3 are disclosed in a superimposed relationship, it is also understood that a single heater, or a single heater in combination with a heat reflector, where the heater is on one side of the film F and the heat reflector is on the other side so as to substantially oppose one another, may instead be provided depending upon the particular application.

After being developed by the heaters 3, the film F is conveyed to the output O of the film heat processor 1. The film F may then be manually retrieved or delivered to an output tray (not shown).

Although the film processor 1 is shown as having a conveying surface appropriately sized to the width of a single sheet of film, it is understood that the width of the conveying surface may be increased in order to permit a plurality of films to be simultaneously developed.

When the film heat processor 1 is combined with an exposure device, it may either be connected externally to the exposure device or be formed as an integral part of the exposure device as a single unit construction. A film buffer may be provided between the exposure device and the film processor in order to permit temporary accumulation of the film prior to developing. In addition, the continuous transport 2 is preferably driven with a speed at least as great as the speed at which the film travels through the exposure device in order to enhance productivity.

Figure 2:
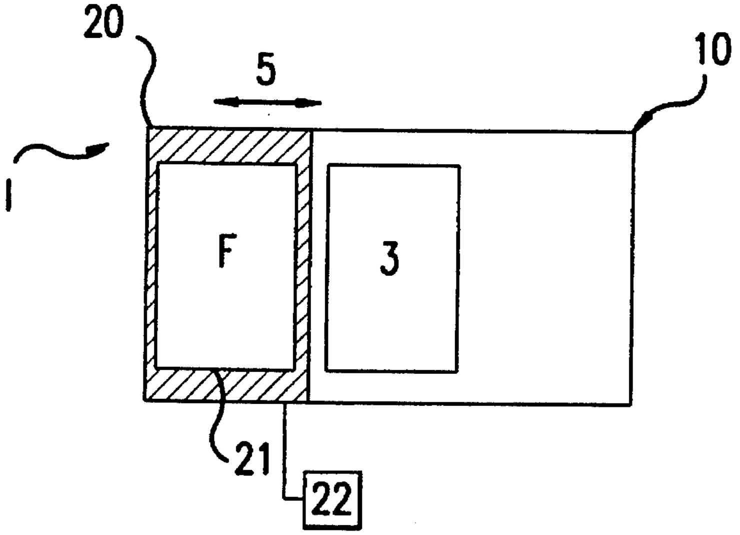
FIG. 2 is a schematic view of a film heat processor according to a second embodiment of the invention.

FIG. 2 is a schematic view of film heat processor according to a second embodiment of the invention.

The film heat processor 10 includes a reciprocating film transport 20 which reciprocates in the direction shown by arrow 5. The reciprocating film transport may comprise, for example, a fabric 21 stretched over a frame member. As in the prior embodiment, the fabric of the film transport is selected to have a low specific heat and good transparency so as not to impede or absorb the radiant energy emitted by the heaters 3. The frame member is reciprocated on rails (not shown) by a conventional reciprocating drive arrangement 22.

In operation, a film is received on the reciprocating film transport 20 at input end I and is reciprocated past the heaters 3 (discussion of heaters 3 from this point on includes the alternative arrangements discussed with respect to the first embodiment), where it is developed, and then arrives at the other end of the reciprocating film transport 20. The developed film F may then be removed.

As in the first embodiment, the film transport 20 may receive film either manually or directly from an exposure device to which it is either externally connected or contained within.

The second embodiment can provide an advantage in space savings over the first embodiment. Specifically, the length of the film heat processor can be reduced along the film conveying direction by an amount substantially equal to the diameter of an endless belt roller. As in the prior embodiment, the width of the film transport 20 may be increased to accomodate a side by side arrangement of film sheets, thus permitting simultaneous development of a plurality of film sheets.

Figure 3:
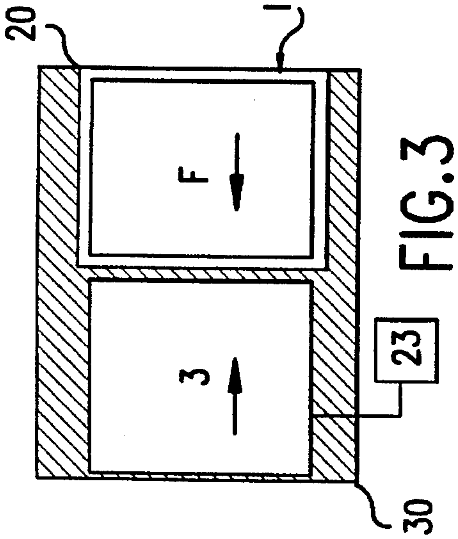
FIG. 3 is a schematic view of a film heat processor according to a third embodiment of the invention.

FIG. 3 is a schematic view of a film heat processor according to a third embodiment of the invention.

The embodiment of FIG. 3 differs from the second embodiment in that a reciprocating drive 23 is provided for reciprocating the heaters 3 parallel, but in a direction opposite to, the film conveying direction. Specifically, the heaters 3 are synchronized so as to directly oppose movement of the reciprocating film transport 20. Viewing FIG. 3, as the film F travels right to left, heaters 3 travel left to right. With this arrangement, the footprint of the film heat processor 30 is even further reduced over the prior embodiments.

Figure 4:
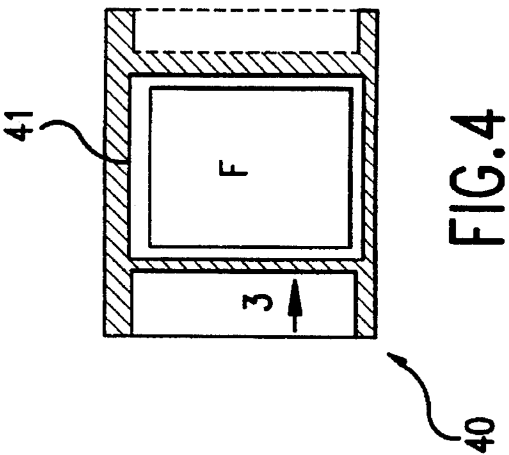
FIG. 4 is a schematic view of a film heat processor according to a fourth embodiment of the invention.

FIG. 4 is a schematic view of film heat processor 40 according to a fourth embodiment of the invention.

The embodiment of FIG. 4 differs from the prior embodiments in that film F is stationary during developing. The film F is manually supplied to, and supported by, a stationary film support 41. As in the second embodiment, the support 41 may comprise a fabric stretched over a frame member. Heaters 3 move from one end of the film support 41 across the film F to the dashed-line position shown in FIG. 4.

Figure 5:
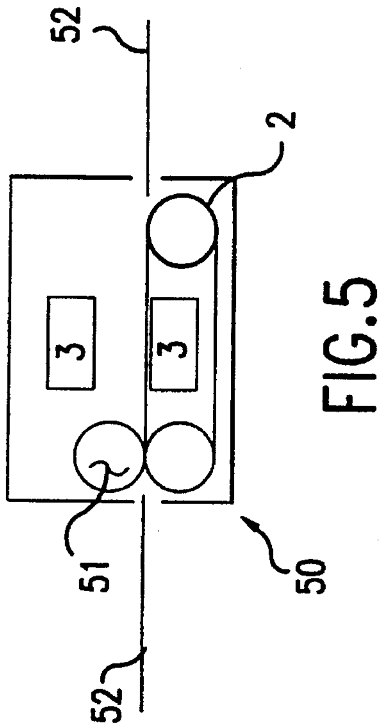
FIG. 5 is a schematic view of a film heat processor according to a fifth embodiment of the invention.

FIG. 5 is a schematic view of film heat processor according to a fifth embodiment of the invention.

The heat film processor 50 is similar to the embodiment of FIG. 1 except that a soft, or resiliently compliant, pinch roller 51 is provided for forming a nip with the continuous transport 2. The pinch roller 51 may be made resiliently compliant by providing the roller with a segmented outer surface, which is well known in the art. Trays 52 facilitate input and accumulation of the film sheets F. By providing a pinch roller 51, the length of the continuous transport 2 in the film feeding direction can be reduced since the leading edge of the inputted film will be sufficiently engaged with the continuous transport 2.

Figure 6:
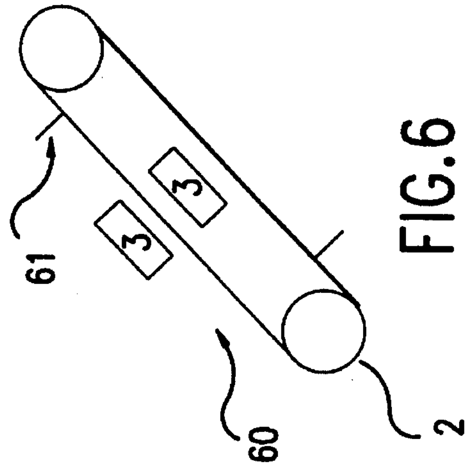
FIG. 6 is a schematic view of a film heat processor according to a sixth embodiment of the invention.

FIG. 6 is a schematic view of film heat processor according to a sixth embodiment of the invention.

The film heat processor 60 is similar to the first embodiment except that the continuous transport 2 is provided in an inclined position. Fences 61 are provided to maintain the film position on the continuous transport 2. With this arrangement, the footprint of the continuous film transport is reduced.

Figure 7:
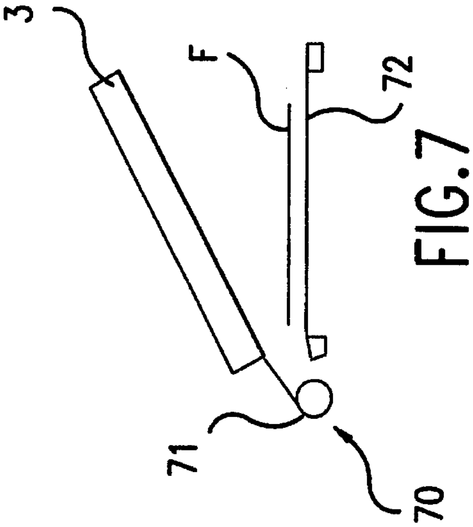
FIG. 7 is a schematic view of a film heat processor according to a seventh embodiment of the invention.

FIG. 7 is a schematic view of film heat processor according to a seventh embodiment of the invention.

The film heat processor 70 includes a hinge 71 for pivotally supporting the heater 3. As in the fourth embodiment, the stationary film support 72 comprises a fabric and frame member arrangement. The hinge 71 controls the closed, ie. operating, position of the heater 3 so that contact between the film and the surface of the heater 3 during developing is prevented. The size of the heater 3 is selected such that at least one, and preferably several, sheets of film may be developed simultaneously.

This embodiment has the advantage of requiring the lowest operating temperature for a given heating time, since the entire film(s) is heated at once. In addition, since several film sheets may be processed at once, production efficiency is increased.

While this invention has been described in conjunction with specific embodiments thereof, it is evident that many alternatives, modification and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A digital film processor, comprising:

a digital film support surface configured to support digital film thereon; and heating means for developing the digital film supported on the digital film support surface by applying heat directly to the digital film without contacting the digital film;

said digital film processor defining a heating region that is open to ambient atmosphere and being configured so that the digital film does not physically contact any member capable of distorting physical properties of the digital film.

2. The film processor according to claim 1, wherein at least one of said film support surface and said heating means is moveable.

3. The film processor according to claim 2, further comprising a film transport for conveying the film past the heating means, said film transport including said film support surface.

4. The film processor according to claim 3, wherein said film transport is a continuous film transport.

5. The film processor according to claim 4, wherein said continuous film transport comprises at least one endless belt.

6. The film processor according to claim 5, wherein said endless belt is inclined with respect to a horizontal direction.

7. The film processor according to claim 6, wherein said endless belt includes at least one projection for maintaining a position of a film supported on the endless belt.

8. The film processor according to claim 4, further comprising a roller forming an input nip with the continuous film transport.

9. The film processor according to claim 3, wherein said film transport is a reciprocating film transport.

10. The film processor according to claim 9, wherein said heating means is a reciprocating heating means.

11. The film processor according to claim 10, wherein said heating means and said film transport move synchronously in opposite directions.

12. The film processor according to claim 1, wherein said heating means has a surface area at least as large as the film to be developed.

13. The film processor according to claim 2, wherein said heating means is a reciprocating heating means.

14. The film processor according to claim 1, wherein said heating means comprises at least one radiant heater.

15. A method of developing digital film comprising the steps of:

providing a digital film support surface configured to support digital film thereon;

providing digital film on said digital film support surface within a heating region that is open to ambient atmosphere; and developing said digital film by applying heat directly from a heating device to the digital film without physically contacting the digital film with said heating device or any other member capable of distorting physical properties of the digital film.

16. The method of claim 15, further comprising the step of moving the film support surface relative to the heating device.

17. The method of claim 16, further comprising the step of providing a continuous film transport.

18. The method of claim 16, further comprising the step of providing a reciprocating film transport.

19. The method of claim 16, wherein said moving step includes moving the heating device.

20. The method of claim 15, wherein said step of applying heat includes applying radiant energy to the film.

21. A digital film processor, comprising:

a digital film support surface configured to support digital film thereon; and heating means for developing the digital film supported on the digital film support surface by applying heat directly to the digital film without contacting the digital film;

said digital film processor defining a heating region that is open to ambient atmosphere and being configured so that the digital film does not physically contact any member capable of distorting physical properties of the digital film, said digital film support surface having a specific heat and a thermal transparency selected so that said digital film support surface neither absorbs nor impedes substantially radiant energy generated by said heating means.

* * * * *